(12) United States Patent
Wieczorek et al.

(10) Patent No.: US 7,106,874 B2
(45) Date of Patent: Sep. 12, 2006

(54) METHOD AND SYSTEM FOR SELECTIVE COUPLING OF A COMMUNICATION UNIT TO A HEARING ENHANCEMENT DEVICE

(75) Inventors: Alfred B. Wieczorek, Davie, FL (US); Brian L. Adair, Spring Hill, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/890,006

(22) Filed: Jul. 13, 2004

(65) Prior Publication Data

US 2006/0013423 A1    Jan. 19, 2006

(51) Int. Cl.
*H04R 25/00* (2006.01)
(52) U.S. Cl. .................. 381/331; 381/312; 381/315
(58) Field of Classification Search ............. 381/331, 381/312, 324, 326, 314, 315, 320, 321, 328, 381/330; 379/444, 373.01, 448, 52, 430, 379/443

See application file for complete search history.

(56) References Cited

U.S. PATENT DOCUMENTS

| | | | |
|---|---|---|---|
| 4,046,960 A | 9/1977 | Veale | |
| 4,173,941 A | 11/1979 | Castagna | |
| 4,285,065 A | 8/1981 | Priniski | |
| 4,340,780 A | 7/1982 | Odlen | |
| 4,461,026 A | 7/1984 | Priniski | |
| 4,703,355 A | 10/1987 | Cooper | |
| 4,891,841 A | 1/1990 | Bohn | |
| 4,903,307 A | 2/1990 | Ozawa et al. | |
| RE33,535 E | 2/1991 | Cooper | |
| 5,046,105 A | 9/1991 | Bohn | |
| 5,086,464 A * | 2/1992 | Groppe ...................... 381/331 |
| 5,195,141 A | 3/1993 | Jang | |
| 5,282,252 A | 1/1994 | Orban | |
| 5,530,769 A | 6/1996 | Saitoh | |
| 5,754,668 A | 5/1998 | Funahashi et al. | |
| 5,987,145 A | 11/1999 | Lawton | |
| 6,088,460 A | 7/2000 | Funahashi et al. | |
| 6,111,755 A | 8/2000 | Park | |
| 6,381,270 B1 | 4/2002 | Lydon et al. | |
| 6,760,457 B1* | 7/2004 | Bren et al. .................. 381/331 |
| 6,925,179 B1* | 8/2005 | Waldron et al. ............ 379/443 |
| 2004/0136555 A1* | 7/2004 | Enzmann .................... 381/314 |
| 2005/0031118 A1* | 2/2005 | Cochran et al. ............ 379/443 |

OTHER PUBLICATIONS

U.S. Appl. No. 10/842,359, Not yet published, Patino et al.
Mark Ross—Telecoil and Telephones—The Most Commonly Misunderstood "Assistive Listening Device". This article appeared in the Jan./Feb. 2002 issue of *Hearing Loss; The Journal of Self Help for Hard of Hearing People*. Downloaded from the HearingLoss.org website.
Dana Mulvany and Ron Vickery (Principal Investigators)—SHH—Self help for Hard of Hearing People—An Analysis of Inductive Coupling and Interference Issues in Digital Wireless Phones: Technically Feasible Solutions. Jan. 15, 2003. Downloaded from the HearingLoss.org website.

\* cited by examiner

*Primary Examiner*—Huyen Le
(74) *Attorney, Agent, or Firm*—Larry G. Brown

(57) ABSTRACT

The invention concerns a method (200) and system (100) for selectively coupling a communication unit (110) to a hearing enhancement device (112). The method includes the steps of—in the communication unit—selecting (212) between an acoustic coupling setting and an inductive coupling setting, in response to the selecting step, switching (214) an audio output of the communication unit to an acoustic coupling path (136) or an inductive coupling path (138), and outputting (226) through either the acoustic coupling path or the inductive coupling path an audio signal to the hearing enhancement device.

17 Claims, 3 Drawing Sheets

METHOD AND SYSTEM FOR SELECTIVE COUPLING OF A COMMUNICATION UNIT TO A HEARING ENHANCEMENT DEVICE

BACKGROUND OF THE INVENTION

1. Field of the Invention

This invention relates in general to methods and systems for coupling a communications unit to another electronic device and more particularly, coupling the communications unit to a hearing enhancement device.

2. Description of the Related Art

In recent years, communication units, such as cellular telephones and personal digital assistants, have become commonplace. Many users of such units may wear hearing enhancement devices, commonly referred to as hearing aids. Many hearing aids contain two types of coupling paths: (1) acoustic coupling and (2) inductive coupling. For acoustic coupling, a microphone that is within the hearing aid receives audio from an external source and transfers it to an amplification stage of the hearing aid. Regarding inductive coupling, the hearing aid typically includes an axial or radial telecoil, or T-coil. A magnetic field that is generated by an external, sound-producing device can cause a signal to be induced in the T-coil of the hearing aid, and this signal is transferred to the amplification stage. The hearing aid normally includes a switch that permits a user to select one of these coupling paths.

The Federal Communications Commission (FCC) has mandated that cellular telephone manufacturers soon produce cellular telephones that are compatible with hearing aids. The compatibility is based on standards set forth by the American National Standards Institute (ANSI). In addition, the compatibility applies to both acoustic coupling and inductive coupling.

The acoustic path for most cellular telephones, however, includes a housing, and the acoustic characteristics of the housing affect the audio frequency response of a cellular telephone. To limit the effect of the housing on the audio frequency response, many cellular telephones include an audio equalizer, which can be used to manipulate the audio signal being fed to a speaker of the cellular telephone. The audio equalizer can produce an optimal acoustic frequency response, one that is satisfactory for users who do or do not wear hearing aids. Additionally, this frequency response meets industry standards for an acoustically-coupled hearing aid.

Unfortunately, this manipulation of the audio signal produces a less-than-optimal frequency response for an inductively-coupled hearing aid. In fact, this less-than-optimal frequency response fails to meet the FCC's compatibility requirements for magnetically coupled hearing aids. Additionally, if the audio signal is adjusted to produce an optimal frequency response for an inductively-coupled hearing aid, the frequency response for an acoustically-coupled hearing aid will suffer and will fail to meet the FCC's compatibility requirement.

SUMMARY OF THE INVENTION

The present invention concerns a method for selectively coupling a communication unit to a hearing enhancement device. The method includes the steps of—in the communication unit—selecting between an acoustic coupling setting and an inductive coupling setting, in response to the selecting step, switching an audio output of the communication unit to one of an acoustic coupling path and an inductive coupling path, and outputting through one of the acoustic coupling path and the inductive coupling path an audio signal to the hearing enhancement device. The method can also include the steps of—in the hearing enhancement device—selecting between an acoustic coupling setting and an inductive coupling setting and in response to the selecting step in the hearing enhancement device, switching an audio input of the hearing enhancement device to one of an acoustic coupling path and an inductive coupling path.

In one arrangement, the method can include the step of applying an equalization setting to the audio signal based on which of the acoustic coupling path and the inductive coupling path is selected. This equalization setting can be selected from a plurality of equalization settings. Additionally, the method can include the steps of feeding the audio signal to a first coil of a speaker, generating a magnetic field through the first coil of the speaker, and inducing a corresponding signal in a second coil in the hearing enhancement device. As an example, the communication unit can be a wireless communication unit. Further, the applying the equalization setting step can include the step of selecting one of a plurality of filters in which at least one of the filters is a default filter.

In another arrangement, when the audio signal is output through the acoustic coupling path, the audio signal can have a frequency response that at least meets a predetermined acoustic coupling frequency response requirement. Alternatively, when the audio signal is output through the inductive coupling path, the audio signal can have a frequency response that at least meets a predetermined inductive coupling frequency response requirement.

The present invention also concerns a system for selectively coupling a communication unit to a hearing enhancement device. The system includes a speaker for outputting an audio signal, an equalizing block having an acoustic coupling path and an inductive coupling path, a switch for selectively coupling one of the acoustic coupling path and the inductive coupling path of the equalizing block to the speaker and a processor coupled to the switch. The processor is programmed to cause the switch to couple one of the acoustic coupling path and the inductive coupling path of the equalizing block to the speaker based on the selection of one of an acoustic coupling setting and an inductive coupling setting. The system can also includes suitable software and/or circuitry to carry out the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
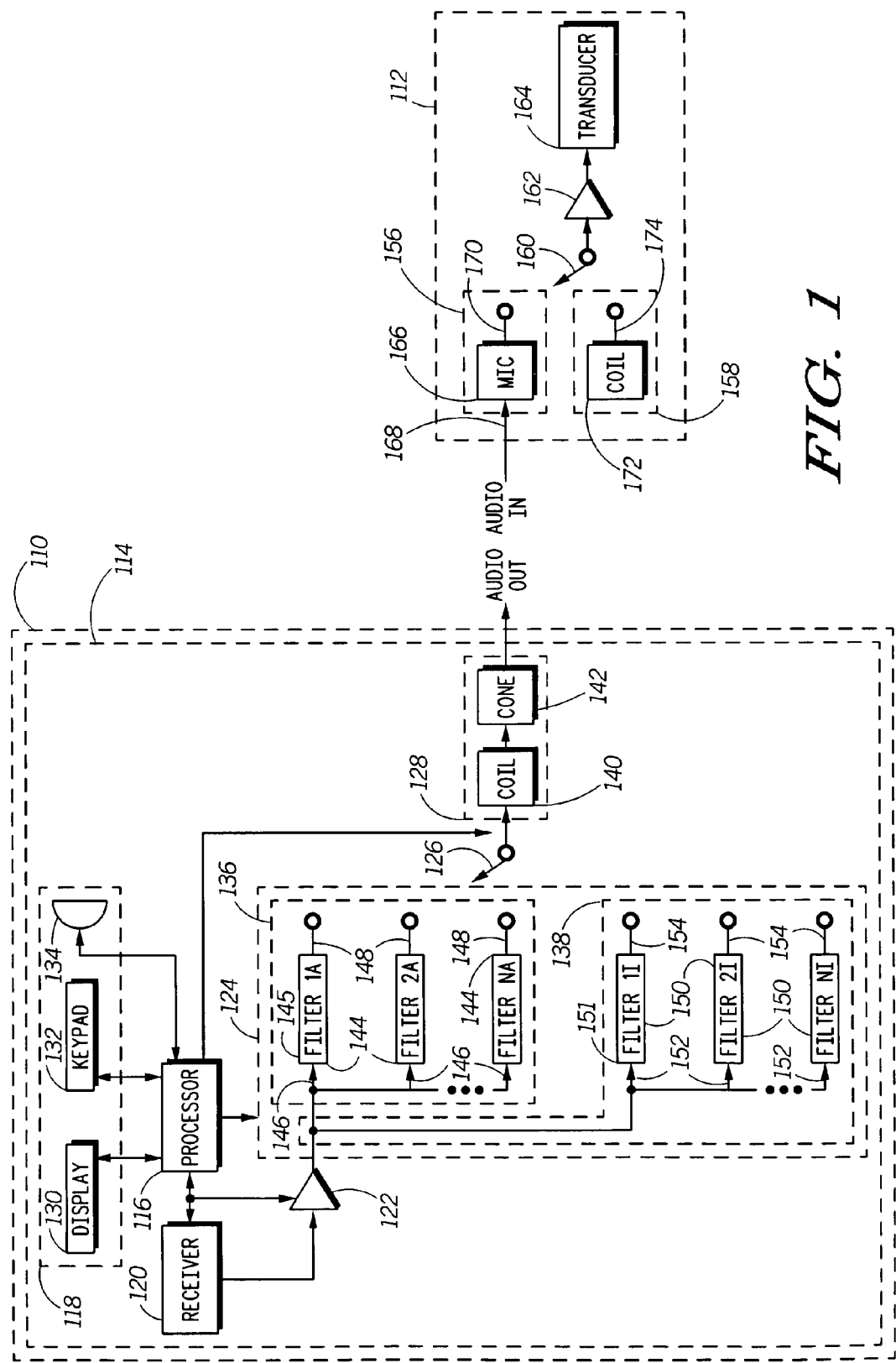
FIG. 1 illustrates a system for selectively coupling a communication unit to a hearing enhancement device in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

This invention presents a method and system for coupling a communication unit to a hearing enhancement device. For example, the communication unit can include a speaker and an equalizing block having an acoustic coupling path and an inductive coupling path. The communication unit can also include a switch for selectively coupling the speaker with either the acoustic coupling path or the inductive coupling path. The speaker can output an audio signal to the hearing enhancement device, which can also have an acoustic coupling path and an inductive coupling path. When the audio signal is output through the acoustic coupling path of the communication unit, the audio signal can have a frequency response characteristic that at least meets a predetermined acoustic coupling frequency response requirement. Similarly, when the audio signal is output through the inductive coupling path of the communication unit, the audio signal can have a frequency that at least meets a predetermined acoustic coupling frequency response requirement.

Referring to FIG. 1, a system 100 for selectively coupling a communication unit 110 to a hearing enhancement device 112 is shown. In one arrangement, the system 100 can be contained within a housing 114 of the communication unit 110. As an example, the communication unit 110 can be a wireless communication unit, such as a cellular or cordless telephone. It is understood, however, that the communication unit 110 can be any device that is capable of producing sound.

The system 100 can include a processor 116, a user interface section 118, a receiver 120, an amplifier 122, an equalizing block 124, a switch 126 and a speaker 128. In one arrangement, the receiver 120 can be a wireless receiver. As an example, the user interface section 118 can include a display 130, a keypad 132 and a microphone 134, and the processor 116 can be coupled to and control the operation of all three of these components. The display 130 can display any suitable form of data, including equalizer settings and selections, to a user of the communication unit 110 and can also be configured as a touch screen display to permit the user to enter information into the communication unit 110. The user may also use the keypad 132 and the microphone 134 to enter such information into the communication unit 110. To use the microphone 134 to enter information, the communication unit 110 may include suitable voice recognition control software and circuitry, as is known in the art. As will be explained below, the user interface section 118 can permit a user to select between an acoustic coupling setting and an inductive coupling setting in the communication unit 110.

The processor 116 can also be coupled to and control the operation of the receiver 120, the amplifier 122, the equalizing block 124 and the switch 126. As is known in the art, the receiver 120 can receive and process any suitable type of communications signal to form an audio signal that can be fed to the amplifier 122. In one arrangement, the equalizing block 124 can include an acoustic coupling path 136 and an inductive coupling path 138, and the output of the amplifier 122 can be coupled to both paths 136, 138. In another arrangement, the acoustic coupling path 136 and the inductive coupling path 138 are not required to share an input. As a result, the system can include two separate amplifiers 122 for coupling to the acoustic coupling path 136 and the inductive coupling path 138. The processor 116 can direct the switch 126 to couple to the acoustic coupling path 136 or the inductive coupling path 138, as will be explained below. The switch 126 can also be coupled to the speaker 128, which, as an example, can include a first coil 140 and a cone 142.

In one arrangement, the equalizing block 124 can apply an equalization setting to an audio signal received from the amplifier 122. The equalization setting that is applied can be based on whether the acoustic coupling path 136 or the inductive coupling path 138 is selected, i.e., coupled to the switch 126. The equalization setting can be selected from a plurality of equalization settings.

For example, the acoustic coupling path 136 can have one or more filters 144, each having an input 146 and an output 148. At least one of the filters 144 can be a default filter 145. In another similar arrangement, the inductive coupling path 138 can have one or more filters 150, each having an input 152 and an output 154, and one of the filters 150 can be a default filter 151. When referring to the filters 144, 150, reference may also be made to the default filters 145, 151. Each of the filters 144, 150 can be either an analog filter or a digital filter, and all or a portion of the filters 144, 150 can be adjustable.

The equalizing block 124 can apply an equalization setting to an audio signal because the filters 144, 150 are capable of producing any suitable frequency response for the audio signal. Specifically, in accordance with an embodiment of the inventive arrangements, the switch 126 can be selectively coupled to the output 154 of at least one of the filters 144 of the acoustic coupling path 136 or to the output 154 of at least one of the filters 150 of the inductive coupling path 138 for producing a desired frequency response.

Once the audio signal exits the equalizing block 124, it can enter the first coil 140 of the speaker 128. As those of skill in the art will appreciate, the audio signal can be used to fluctuate the cone 142 for purposes of producing sound. Through the voice coil, the audio signal can also generate a magnetic field. As an example, the speaker 128 can be any speaker having a coil that is capable of generating a magnetic field when a current is applied to it. In addition, the first coil 140 is not necessarily limited to being positioned in the speaker 128, as the first coil 140 can be located at any other suitable location. In particular, the speaker 128 can be a speaker that has no coil, and the coil 140 can be positioned outside of this speaker.

The hearing enhancement device 112 can include an acoustic coupling path 156, an inductive coupling path 158, a switch 160 (manual or automatic), an amplifier 162 and a transducer 164. The acoustic coupling path 156 of the hearing enhancement device 112 can include a microphone 166 and an input 168 and output 170 for the microphone 166. Further, the inductive coupling path 158 of the hearing enhancement device 112 can include a second coil 172 and an output 174 for the second coil 172. The second coil 172 can be, for example, an inductive coupling coil, such as an axial or radial tele-coil (T-coil).

The switch 160 can be coupled to the amplifier 162 and to either the acoustic coupling path 156 (i.e., the output 170 of the microphone 166) or the inductive coupling path 158 (i.e., the output 174 of the second coil 172). If the switch 160 is set to an acoustic coupling setting, the switch 160 can be coupled to the output 170 of the microphone 166. The audio signal output from the speaker 128 of the communication unit 110 can be captured by the microphone 166 and transferred to the amplifier 162. After amplification, the amplifier 162 can transfer the signal to the transducer 164. As is known in the art, the magnetic field that the first coil 140 of the speaker 128 generated can induce a corresponding signal in the second coil 172. This process can also be referred to as outputting an audio signal to the hearing enhancement device 112. If the switch 160 is coupled to the output 174 of the second coil 172, the magnetically induced signal can be sent to the amplifier 162 for amplification and on to the transducer 164.

Thus, consider the following scenario: the switch 126 in the communication device 110 can be coupled to the acoustic coupling path 136, and the switch 160 in the hearing enhancement device 112 can be coupled to the acoustic coupling path 156. The communication unit 110 can be considered to be acoustically coupled to the hearing enhancement device 112. Consider another scenario: the switch 126 can be coupled to the inductive coupling path 138, and the switch 160 can be coupled to the inductive coupling path 158. In this example, the communication unit 110 can be considered to be inductively coupled to the hearing enhancement device 112. It is understood, however, that the invention is not limited to these particular examples, as other suitable coupling combinations can be employed.

The system shown in FIG. 1 is merely one example of a system for coupling a communication device to a hearing enhancement device. Other suitable systems for coupling a communication unit to a hearing enhancement device can be used. Moreover, the equalizing block 124 shown is merely one example of a component that can be used to apply equalization settings to an outgoing audio signal. In fact, the equalizing block 124 can be any suitable component or group of components that can be used to manipulate the frequency response of the outgoing audio signal.

Figure 2:
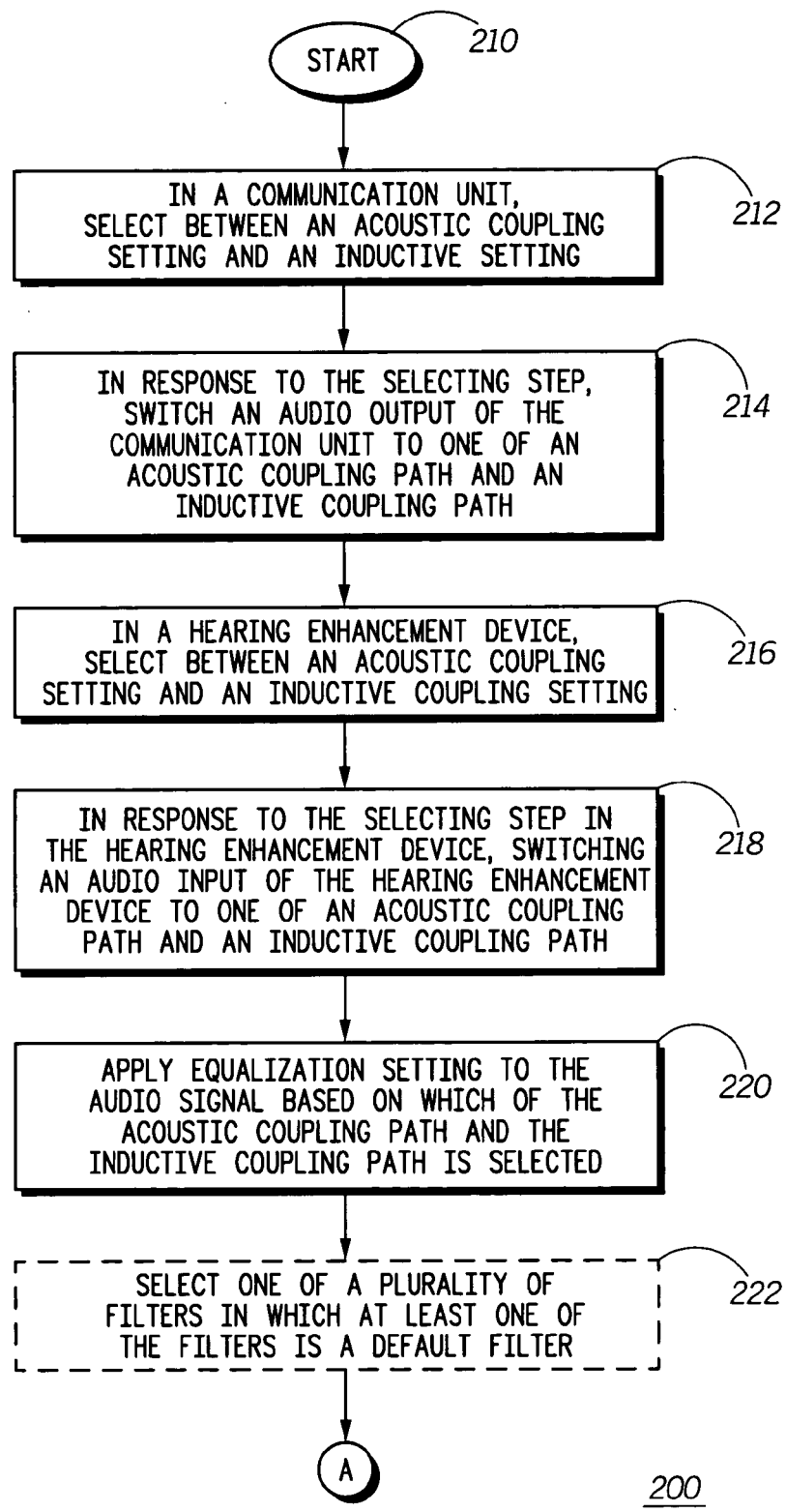
FIG. 2 illustrates a method for selectively coupling a communication unit to a hearing enhancement device in accordance with an embodiment of the inventive arrangements.

Referring to FIG. 2, a method 200 for selectively coupling a communication unit to a hearing enhancement device is shown. To describe the method 200, reference will be made to FIG. 1, although it must be noted that the method 200 can be practiced in any other suitable system or device. Moreover, the inventive method is not limited to the steps of the method 200 or to the order in which they are presented. That is, the inventive method can include a greater or lesser number of steps than what is shown in the method 200.

At step 210, the method 200 can begin. At step 212, in a communication unit, a selection can be made between an acoustic coupling setting and an inductive coupling setting. At step 214, in response to the selecting step 212, an audio output of the communication unit can be switched to one of an acoustic coupling path and an inductive coupling path. At step 216, in a hearing enhancement device, a selection can also be made between an acoustic coupling setting and an inductive coupling setting. In response to the selecting step 216, an audio input of the hearing enhancement device can be switched to one of an acoustic coupling path and an inductive coupling path of the hearing aid device, as shown at step 218.

For example, a user of the communication unit 110 can select between an acoustic coupling setting and an inductive coupling setting. The acoustic coupling setting can be used to acoustically couple the communication unit 110 to the hearing enhancement device 112. Likewise, the inductive coupling setting can be used to inductively couple the communication unit 110 to the hearing enhancement device 112. The user can make such a selection by inputting information into the communication unit 110 through the user interface section 118. As an example, a user can select an acoustic or inductive coupling setting through interaction with the keypad 132, the display 130 or the microphone 134. The user may also select filter or equalizer settings.

The processor 116 detects this selection, and in response, the processor 116 can control the operation of the switch 126. For example, if the user has selected the acoustic coupling setting, the processor 126 can signal the switch 126 to couple to the acoustic coupling path 136. Conversely, if the user has selected the inductive coupling setting, the processor 116 can signal the switch 126 to couple to the inductive coupling path 138. As will be explained below, when an audio signal is output through the acoustic coupling path 136, the audio signal can have a frequency response that meets or exceeds a predetermined acoustic coupling frequency response requirement. When the audio signal is output through the inductive coupling path, the audio signal can have a frequency response that meets or exceeds a predetermined inductive coupling frequency response requirement.

In the hearing enhancement device 112, a user can operate, for example, a toggle switch (not shown) to select either an acoustic coupling setting or an inductive coupling setting. For example, if an acoustic coupling setting is selected, then the switch 160 can be coupled to the acoustic coupling path 156, e.g., the output 170 of the microphone 166. On the other hand, if an inductive coupling setting is selected, the switch 160 can be coupled to the inductive coupling path 158, e.g., the output 174 of the second coil 172.

Referring back to the method 200 of FIG. 2, at step 220, an equalization setting can be applied to an audio signal in the communication unit in which the equalization setting can be based on whether the acoustic coupling path or the inductive coupling path is selected. As an example, at option step 222, this step of applying an equalization setting can include selecting at least one of a plurality of filters for filtering the audio signal. One of the filters can be a default filter.

For example, once again referring to FIG. 1, the equalizing block 124 can apply an equalization setting to the audio signal that it receives from the amplifier 122. As noted earlier, in one arrangement, the acoustic coupling path 136 of the equalizing block 124 can include one or more filters 144, one of which can be a default filter 145. Additionally, the inductive coupling path 138 can include one or more filters 150, one of which can be a default filter 151. If the user selects an acoustic coupling setting in step 212, then the processor 116 can signal the switch 126 to couple at least one of the filters 144 (which may or may not be the default filter 145). If, however, the user selects the inductive coupling setting, the processor 116 can signal the switch 126 to couple at least one of the filters 150 (which also may or may not be the default filter 151).

The type of filter 144, 150 selected can be based on the type of frequency response for the audio signal that the user desires. In one arrangement, the default filter 145 in the acoustic coupling path 136 can filter the audio signal such that the frequency response of the audio signal meets or exceeds the predetermined acoustic coupling frequency response requirement. Similarly, the default filter 151 in the inductive coupling path 138 can filter the audio signal such that the frequency response of the audio signal meets or exceeds the predetermined inductive coupling frequency response requirement.

As an example, the predetermined acoustic and inductive coupling frequency response requirements can be requirements for hearing enhancement devices that are set by a governmental agency, such as the FCC. As a more specific example and without limitation, the acoustic and inductive coupling frequency response requirements can be defined in accordance with ANSI standard C63.19-2001. Of course, other standards may be applicable. In addition, the frequency response requirements can be obligatory or voluntary in nature, and they can be determined by any other suitable organization, including private entities. In addition, the frequency response requirements can be for other suitable electronic devices other than a hearing enhancement device.

While both the acoustic coupling path 136 and the inductive coupling path 138 may only contain default filters 145, 151, it is understood that the invention is not so limited. Specifically, the acoustic coupling path 136 and/or the inductive coupling path 138 may contain additional filters 144, 150. Each of these filters 144, 150 can provide the audio signal with a different frequency response, and the switch 126 can be coupled to any one of them. These frequency responses may or may not meet or exceed the acoustic and inductive coupling frequency response requirements for a hearing enhancement device discussed above.

To select a particular filter 144, 150, a user can enter information in the user interface section 118 in accordance with the above description. This selection can be used to generate a desired frequency response of the audio signal. In response, the processor 116 can signal the switch 126 to couple to the appropriate filter 144, 150. As a result, a user who, for example, wears a hearing enhancement device 112 can select an equalization setting to produce an optimal audio output, and this output may (or even may not) meet or exceed recommended or mandatory frequency response requirements for the hearing enhancement device 112.

It is understood that the invention is not limited in this regard. In particular, the equalizing block 124 can include any other suitable component(s) for adjusting the frequency response of the audio signal. For example, the equalizing block can include additional active and passive components to enable a user (including an audiologist) to vary the frequency response even further.

Figure 3:
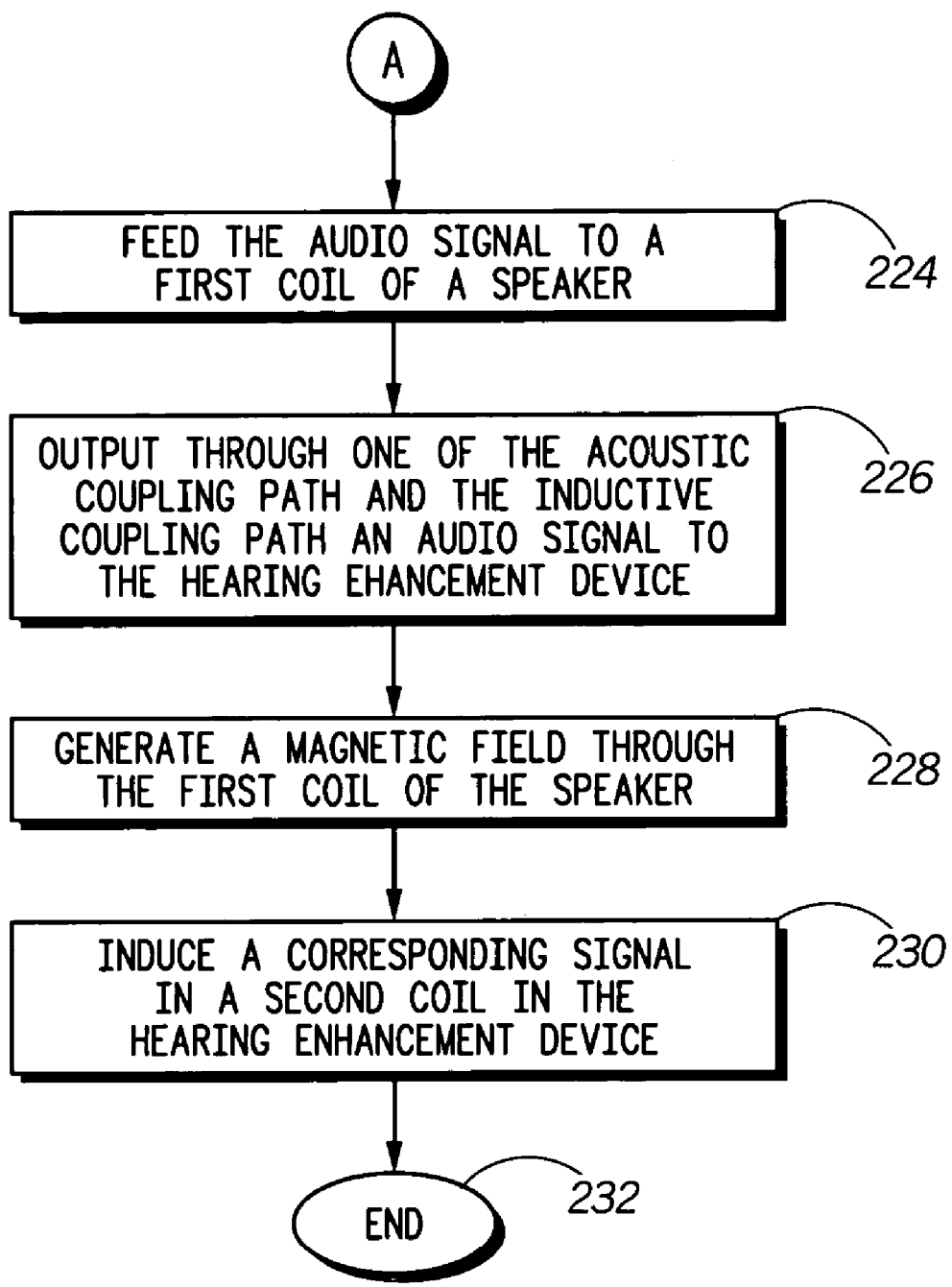
FIG. 3 illustrates a portion of the method of FIG. 2 in accordance with an embodiment of the inventive arrangements.

Referring to the method 200 of FIG. 3, at step 224 through the jump circle A, the audio signal can be fed to a first coil of a speaker. At step 226, the audio signal can be output to the hearing enhancement device through either the acoustic coupling path or the inductive coupling path. In addition, a magnetic field can be generated through the first coil of the speaker, as shown as step 228. This magnetic field can induce a corresponding signal in a second coil in the hearing enhancement device, as shown at step 230. Finally, the method 200 can end at step 232.

For example, the user may select an acoustic coupling setting in the communication unit 110 and the hearing enhancement device 112. As such, the audio signal in the communication unit 110 can be routed through the acoustic coupling path 136 and on to the first coil 140 of the speaker 128. As is known in the art, the cone 142 can generate sound waves that can pass through the housing 114, and an audio signal can be transmitted to the hearing enhancement device 112. At the hearing enhancement device 112, the audio signal can be picked up by the microphone 166 and eventually sent to the transducer 164.

Alternatively, if the user has selected an inductive coupling setting in the communication unit 110 and the hearing enhancement device 112, the audio signal can be routed through the inductive coupling path 138. The audio signal can then be sent to the first coil 140, where it can cause a magnetic field to be generated. This magnetic field can induce a corresponding signal in the second coil 172, which can eventually be transmitted to the transducer 164. As such, this process also outputs an audio signal to the hearing enhancement device 112. If desired, the user can freely switch between acoustically or inductively coupling the communication unit 110 to the hearing enhancement device 112. In either setting and in accordance with an embodiment of the inventive arrangements, the output audio signal can have an optimal frequency response, including one that can meet certain predetermined frequency response requirements.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for selectively coupling a communication unit to a hearing enhancement device, comprising the steps of:
   in the communication unit, selecting between an acoustic coupling setting and an inductive coupling setting;
   in response to the selecting step, switching an audio output of the communication unit to one of an acoustic coupling path and an inductive coupling path;
   outputting through one of the acoustic coupling path and the inductive coupling path an audio signal to the hearing enhancement device; and
   applying an equalization setting to the audio signal based on which of the acoustic coupling path and the inductive coupling path is selected.

2. The method according to claim 1, further comprising the steps of:
   in the hearing enhancement device, selecting between an acoustic coupling setting and an inductive coupling setting; and
   in response to the selecting step in the hearing enhancement device, switching an audio input of the hearing enhancement device to one of an acoustic coupling path and an inductive coupling path.

3. The method according to claim 1, wherein the equalization setting is selected from a plurality of equalization settings.

4. The method according to claim 3, wherein applying the equalization setting step comprises the step of selecting one of a plurality of fillers, wherein at least one of the filters is a default filter.

5. The method according to claim 1, further comprising the steps of:
feeding the audio signal to a first coil of a speaker;
generating a magnetic field through the first coil of the speaker; and
inducing a corresponding signal in a second coil in the hearing enhancement device.

6. The method according to claim 1, wherein the communication unit is a wireless communications unit.

7. The method according to claim 1, wherein when the audio signal is output through the acoustic coupling path, the audio signal has a frequency response that at least meets a predetermined acoustic coupling frequency response requirement.

8. The method according to claim 1, wherein when the audio signal is output through the inductive coupling path, the audio signal has a frequency response that at least meets a predetermined inductive coupling frequency response requirement.

9. A system for selectively coupling a communication unit to a hearing enhancement device, comprising:
a speaker for outputting an audio signal;
an equalization block having an acoustic coupling path and an inductive coupling path;
a switch for selectively coupling one of the acoustic coupling path and the inductive coupling path of the equalizing block to the speaker; and
a processor coupled to the switch, wherein the processor is programmed to cause the switch to couple one of the acoustic coupling path and the inductive coupling path of the equalizing block to the speaker based on the selection of one of an acoustic coupling setting and an inductive coupling setting;
wherein the equalization block applies an equalization setting to the audio signal based on which of the acoustic coupling path and the inductive coupling path is selected.

10. The system according to claim 9 wherein the hearing enhancement device includes an acoustic coupling path and an inductive coupling path and a switch for selecting between one of the acoustic coupling path and the inductive coupling path.

11. The system according to claim 9 wherein the equalization setting is selected from a plurality of equalization settings.

12. The system according to claim 9, wherein the speaker includes a first coil and the hearing enhancement device includes a second coil, wherein when the audio signal is fed to the first coil, a magnetic field is generated through the first coil and the magnetic field induces a corresponding signal in the second coil in the heating enhancement device.

13. The system according to claim 9, wherein the communication unit is a wireless communication unit.

14. The system according to claim 9, wherein both of the acoustic coupling path and the inductive coupling path include at least one filter for filtering the audio signal, wherein at least one of the filters in both the acoustic coupling path and the Inductive coupling path is a default filter.

15. The system according to claim 9, wherein when the audio signal is output through the acoustic coupling path, the audio signal has a frequency response that at least meets an acoustic coupling frequency response requirement.

16. The system according to claim 9, wherein when the audio signal is output through the inductive coupling path, the audio signal has a frequency response that at least meets an inductive coupling frequency response requirement.

17. The system according to claim 9, further comprising a user interface section, wherein the user interface section includes a display, a keypad and a microphone.

* * * * *